US007007358B2

(12) United States Patent
Poling et al.

(10) Patent No.: US 7,007,358 B2
(45) Date of Patent: Mar. 7, 2006

(54) MECHANISM FOR FEEDING LOOPS INTO A CLIP ATTACHMENT APPARATUS

(75) Inventors: Kim L. Poling, Fuquay-Varina, NC (US); Everette L. Branch, Bracey, NC (US)

(73) Assignee: Delaware Capital Formation, Wilmington, DE (US)

( * ) Notice: Subject to any disclaimer, the term of this patent is extended or adjusted under 35 U.S.C. 154(b) by 60 days.

(21) Appl. No.: 10/753,790

(22) Filed: Jan. 8, 2004

(65) Prior Publication Data

US 2005/0060880 A1 Mar. 24, 2005

Related U.S. Application Data

(60) Provisional application No. 60/504,801, filed on Sep. 22, 2003.

(51) Int. Cl.
*B23P 11/00* (2006.01)

(52) U.S. Cl. .............................. 29/243.56; 29/243.57; 29/771; 29/783; 53/138.4; 53/139.4; 53/389.4; 452/30; 452/31; 452/48

(58) Field of Classification Search .................. 452/30, 452/31, 48, 51; 53/138.2, 138.4, 139.4, 389.4; 29/771, 773, 783, 809, 243.56, 243.57
See application file for complete search history.

(56) References Cited

U.S. PATENT DOCUMENTS 4,044,450 A * 8/1977 Raudys et al. ................ 29/509
4,165,593 A * 8/1979 Niedecker .................... 53/413
4,255,833 A * 3/1981 Niedecker .................... 452/51
4,324,086 A * 4/1982 Niedecker .................. 53/134.1
4,503,790 A * 3/1985 Keeton .................. 112/470.33
4,720,010 A 1/1988 Bertram
4,766,713 A * 8/1988 Evans ....................... 53/138.2
4,907,392 A * 3/1990 Knudsen .................... 53/138.8

(Continued)

FOREIGN PATENT DOCUMENTS

DE 4234467 A1 * 4/1993

*Primary Examiner*—Essama Omgba
(74) *Attorney, Agent, or Firm*—Banner & Witcoff, Ltd.

(57) ABSTRACT

An improved mechanism feeds loops or ties into clip attachment apparatus such as a clipper. The loops preferably have tie portions, the carrier may be a tape, and the loops should be in substantially equidistant series on the carrier. The carrier passes around rollers and a dancer, and along a stationary plate. Strip plates are preferably pivotally mounted adjacent the stationary plate. A loop and carrier drive indexes the loops on the carrier toward the clip attachment apparatus. A strip plate drive pivots the strip plates to and from positions in which the strip plates strip a loop adjacent the clip attachment apparatus at least partially from the carrier. The strip plate drive pivots the strip plates to catch the loop adjacent the clip attachment apparatus between the strip plates and pull the loop at least partially from the carrier. The strip plate drive pivots a preferred upper strip plate to catch the loop that is adjacent the clip attachment apparatus between the upper strip plate and a preferred lower strip plate, to pull the tie portion of the loop from the carrier. The loop and carrier drive indexes the carrier in the area of the strip plates a distance corresponding to one loop following each action of the strip plate drive. A loop brake brakes the carrier to allow the strip plates to better strip the loop at least partially from the carrier, the loop brake braking the carrier while the strip plates do the stripping.

13 Claims, 4 Drawing Sheets

U.S. PATENT DOCUMENTS 4,969,233 A * 11/1990 Stanley ........................ 452/30
5,067,313 A 11/1991 Evans
5,077,955 A 1/1992 Evans
5,100,364 A * 3/1992 Kollross et al. ............ 452/185
5,109,648 A * 5/1992 Evans ....................... 53/134.1
5,165,216 A * 11/1992 May et al. .................... 53/413
5,203,759 A 4/1993 Torres et al.
5,209,041 A * 5/1993 Evans ....................... 53/138.4
5,238,444 A * 8/1993 Schwimmer et al. ......... 452/48
5,269,054 A 12/1993 Poteat et al.
5,269,116 A 12/1993 Roberts et al.
5,755,022 A 5/1998 Whittlesey
5,771,664 A * 6/1998 Recchia, Jr. ................. 53/417
6,524,178 B1 2/2003 Fässler et al.
6,691,389 B1 * 2/2004 Topfer ..................... 29/243.57
6,845,596 B1 * 1/2005 May et al. ................. 53/138.4
6,883,297 B1 * 4/2005 Kirk et al. .................... 53/502
2004/0250512 A1 * 12/2004 May et al. .................... 53/413

* cited by examiner

MECHANISM FOR FEEDING LOOPS INTO A CLIP ATTACHMENT APPARATUS

This application claims priority to U.S. Provisional Application Ser. No. 60/504,801, filed Sep. 22, 2003, which is incorporated herein by reference in its entirety.

BACKGROUND OF THE INVENTION

This invention relates to "means to assemble," more specifically to apparatus for feeding plural work parts from plural work sources without manual intervention, and even more specifically, to apparatus for stressing work parts beyond elastic limits. Within these categories of technologies, this invention relates to mechanisms for feeding loops or ties in series into metal clip attachment apparatus, known as clippers.

Numerous patents disclose clip attachment apparatus or clippers. Broadly, these devices attach U-shaped metal clips by deforming the legs of the clips, to place them around such materials as gathered casing for comminuted materials, to form sausage chubs and the like. Example patents include U.S. Pat. No. 5,077,955 issued Jan. 7, 1992 to Evans, U.S. Pat. No. 5,269,054 issued Dec. 14, 1993 to Poteat et al. These are incorporated by reference, and U.S. Pat. No. 6,524,178 issued Feb. 25, 2003 to Fässler et al.

It has been known for some time to be desirable to insert loops or ties under the crowns of the clips so that the loops or ties may be attached to the gathered sausage casing materials or other material simultaneously with the attachment of the clips. The clipped loops or ties may be used to carry, otherwise support or hang the products that are formed and clipped. A variety of loops or ties are known, including those of U.S. Pat. No. 4,720,010 issued Jan. 19, 1988 to Bertram, and U.S. Pat. No. 5,755,022 issued on May 26, 1998 to Whittlesey. These are incorporated by reference.

The '022 patent to Whittlesey also discloses a desirable mechanism for feeding the string loops of that patent into clip attachment apparatus. The mechanism is two-stage, with loops removed from a tape carrier in a first stage, and then transported to the clipper in a second stage. More specifically, referring to FIG. 1 of the Whittlesey patent, starting at the upper left and following loops around, loops start on a tape on a reel 62. They pass over rollers 64, 68, and 70. A plunger 80 pushes the loop end of a loop, as best seen in FIG. 4, such that an arm 82 mounted around a corner can swing by, and snag the loop. The loop is removed from the tape, completing a first stage. Referring to FIG. 8, the snagged loop is pivoted around on the arm 82. Referring to FIGS. 9 and 10, the loop is positioned as in FIG. 9 with the arm 82 retracted, to be caught and moved by a bracket 130 on a belt 88 around to a final position as in FIG. 10. As in FIGS. 10 and 11, the tie or knot end 58 is forward. As in FIG. 11, the tie end enters a clipper window 52, and as a clip moves by, the loop is driven with the clip to be fastened with the clip 40, as in FIG. 12.

Other patents similarly disclose loop and tie feed mechanisms for clippers. These include U.S. Pat. No. 5,067,313 issued Nov. 26, 1991 to Evans, U.S. Pat. No. 5,203,759 issued Apr. 20, 1993 to Torres et al., and U.S. Pat. No. 5,269,116 issued Dec. 14, 1993 to Roberts et al.

Reliability is always a concern of designers of mechanisms for feeding loops or ties into clippers. High reliability for automatic loop insertion is a goal. Another goal is accommodation of loops manufactured with wide dimensional tolerance ranges. Any commercially desirable mechanism must also be as inexpensive as possible.

While the existing products, machines and methods of the "loop feeding art" and the separate "clipping art" have great value, especially those from Tipper Tie Inc., the frontier of technology is ahead of them, to be advanced further by inventive efforts.

SUMMARY OF THE INVENTION

In a principal aspect, this invention constitutes an improved mechanism for feeding loops or ties into clip attachment apparatus. The loops preferably have tie portions, the carrier may be a tape, and the loops should be in substantially equidistant series on the carrier. The mechanism may comprise rollers, a dancer and a stationary plate, the carrier passing around the rollers and dancer, and along the plate.

Strip plates are preferably pivotally mounted on the mechanism adjacent the stationary plate. A loop and carrier drive on the mechanism drives the loops on the carrier toward the clip attachment apparatus. A strip plate drive on the mechanism drives the strip plates to and from a position in which the strip plates strip a loop adjacent the clip attachment apparatus at least partially from the carrier. The strip plate drive pivots the strip plates to catch the loop adjacent the clip attachment apparatus between the strip plates and pull the loop at least partially from the carrier. The strip plates include an upper strip plate and a lower strip plate. The strip plate drive pivots the upper strip plate to catch the loop that is adjacent the clip attachment apparatus between the upper strip plate and the lower strip plate, to pull the tie portion of the loop from the carrier. The loop and carrier drive indexes the carrier in the area of the strip plates a distance corresponding to one loop following each action of the strip plate drive to drive the strip plates to and from a position in which the strip plates strip a loop adjacent the clip attachment apparatus at least partially from the carrier. A loop brake on the mechanism brakes the carrier to allow the strip plates to better strip the loop at least partially from the carrier, the loop brake braking the carrier while the strip plates strip the loop at least partially from the carrier.

In another principal aspect, the invention takes the form of a method of feeding loops in series on a carrier to a clip attachment apparatus, utilizing strip plates. The method comprises at least two steps: moving the loops on the carrier toward the clip attachment apparatus, and moving the strip plates to strip a loop adjacent the clip attachment apparatus from the carrier.

With the invention in forms as described, a new loop feeder and loop feeding method are known. The feeder and method utilize few mechanical parts in minimal space. Unique strip plates are provided, unlike components of the prior art. Reliability is enhanced. Loops manufactured with wide dimensional tolerance ranges are accommodated. The feeder is commercially desirable, as inexpensive.

All these and other objects and advantages of the invention are better understood by a study of the detailed description of the preferred embodiments of the invention, which follows after a brief description of the drawing.

BRIEF DESCRIPTION OF THE DRAWINGS

The accompanying drawing illustrates the specific preferred embodiment of the machine of the invention. Familiarity with the machines of the prior art is assumed. The structure shown in the drawing is not the only form that the invention as claimed may take. The drawing and the following detailed description of the preferred embodiment are intended to limit the claims only as consistent with the law of claim interpretation, whereby claims are interpreted in light of the specification and drawing.

The description which follows may refer to the componentry of the machine in such spatial terms as "forward," front," "rear," "upper," "lower," "left," "right," "behind," etc. Terms such as these, which depend on the specific spatial orientation of the components, are intended for the aid of the reader, and except as incorporated into the claims, they are not intended as a limitation on the possible orientation of components in any possible alternate, but covered, embodiment of the invention. Except as consistent with the law of claim interpretation, the drawing and following description are only illustrative of the invention.

Figure 1:
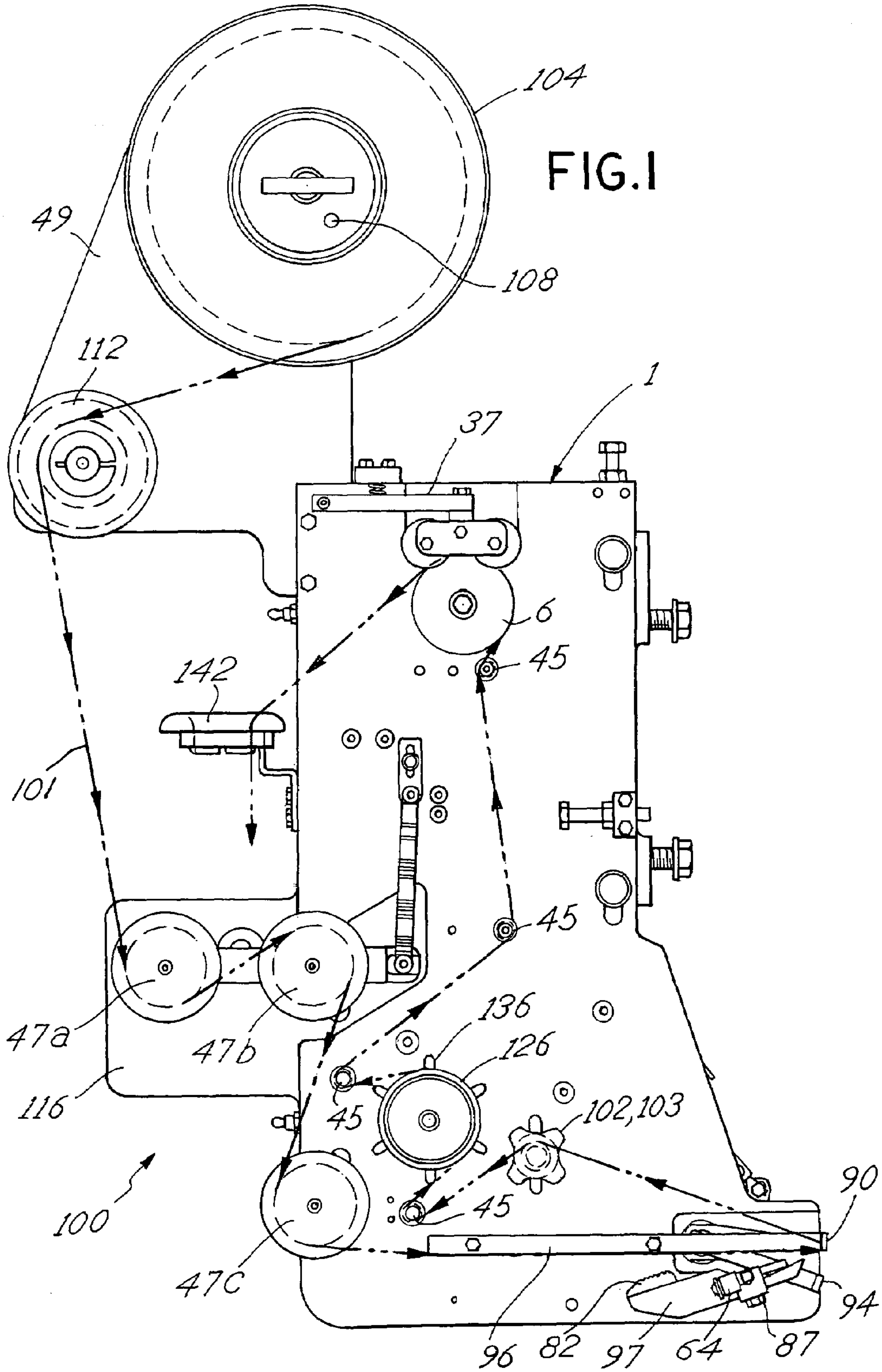
Figure 2:
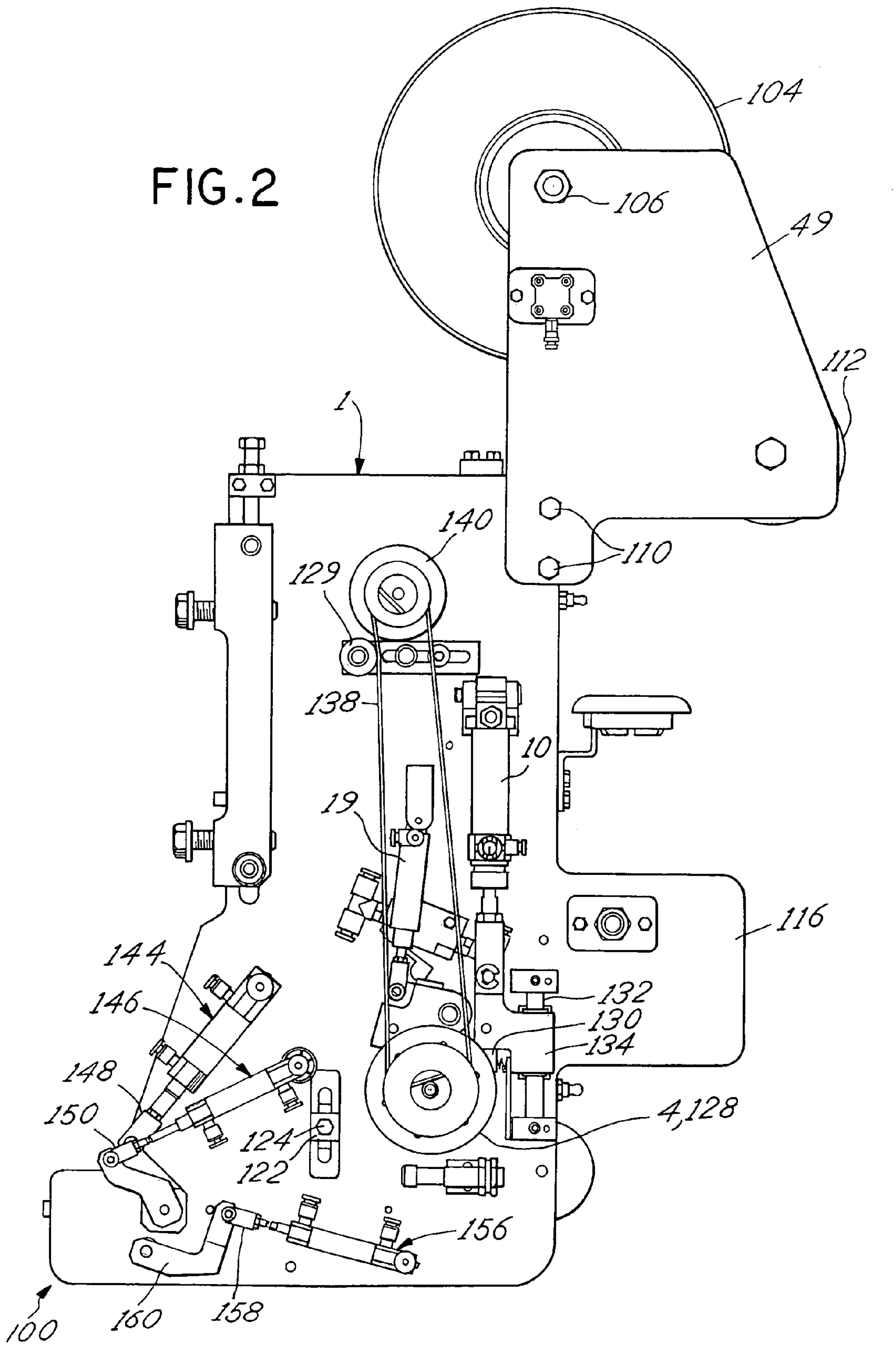
Figure 3:
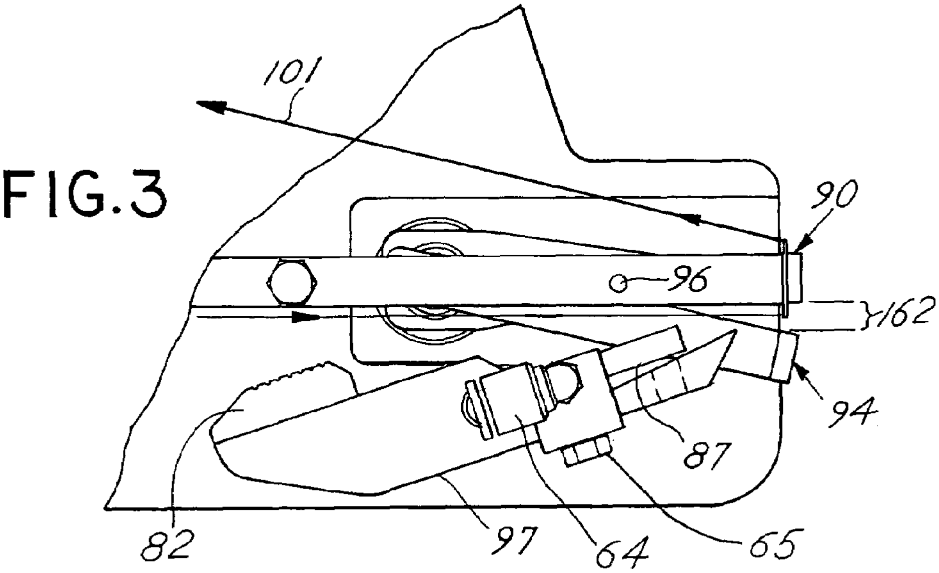
Figure 4:
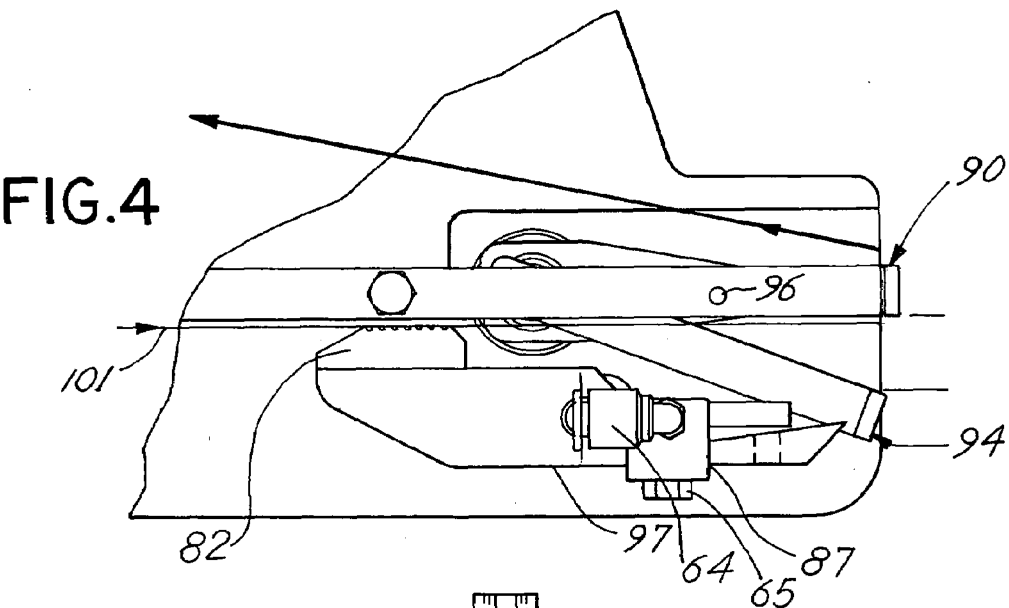
Figure 5:
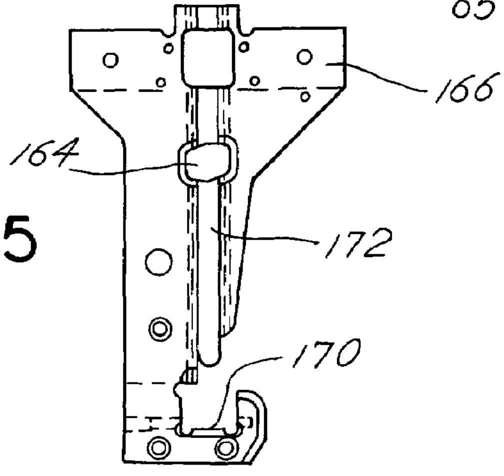
Figure 6:
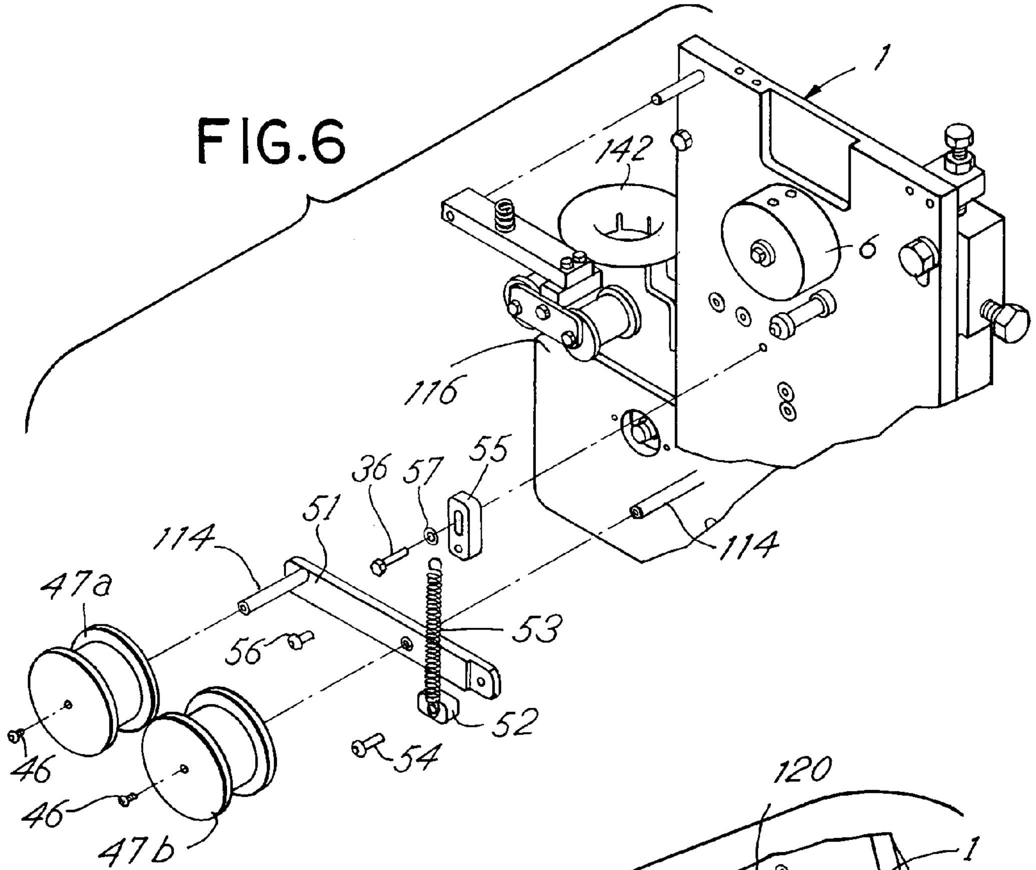
Figure 7:
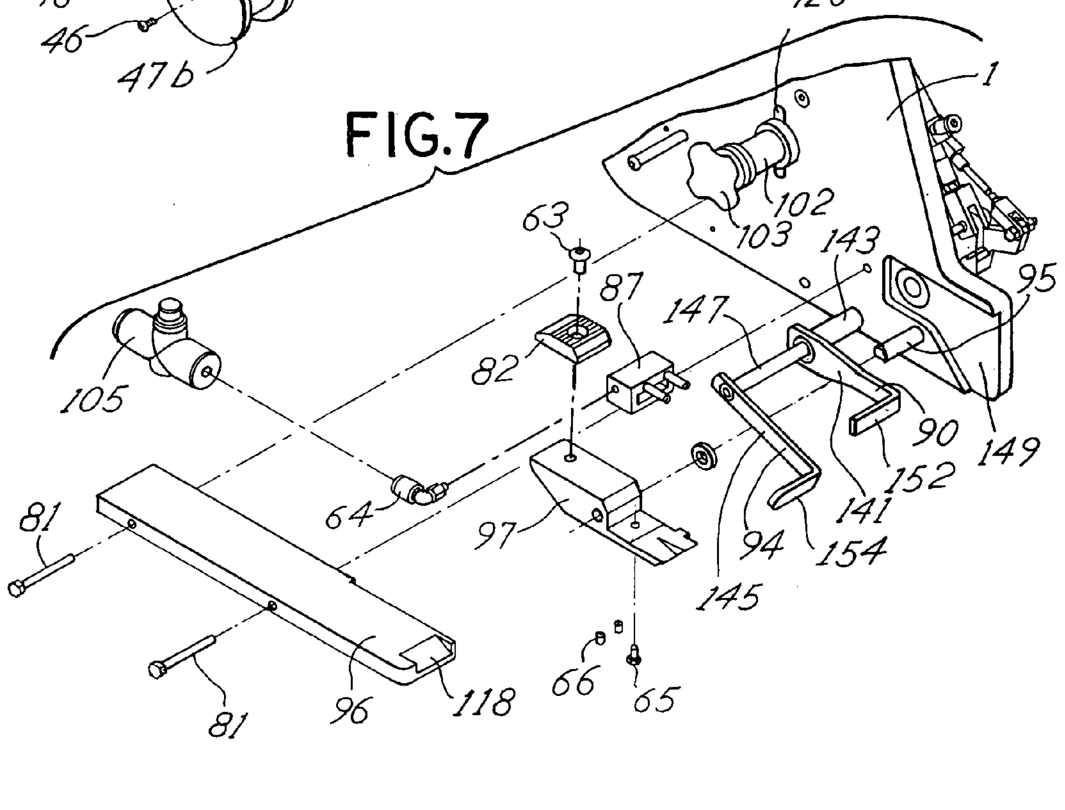

For orientation of the reader to the drawing, and for ease of beginning of reading of the following detailed description, a brief description of the drawing is as follows:

FIG. 1 is a side elevation view of the preferred loop feeding mechanism, or loop feeder, of the invention;

FIG. 2 is a back side elevation view of the loop feeder of FIG. 1;

FIG. 3 is a broken away, close-up view of the feeder of FIG. 1, in the area to the extreme lower right of FIG. 1, with components in a loop-feed condition;

FIG. 4 is a broken away view similar to FIG. 3, with components in a loop brake position;

FIG. 5 is a view of a portion of a clip attachment apparatus, showing a loop feed window into a clip channel;

FIG. 6 is a partially broken away and otherwise exploded perspective view of a portion of the mechanism on the side of FIG. 1; and FIG. 7 is a second view similar to FIG. 6 of another portion of the mechanism.

DETAILED DESCRIPTION OF THE PREFERRED EMBODIMENT

Referring to FIG. 1, the preferred embodiment of the invention constitutes a loop feeder or looper 100 with a looper main mounting plate assembly 1. The path of a loop carrier through the looper 100 is shown by the arrow series 101. Unlike the mechanism of U.S. Pat. No. 5,755,022, and as shown by the carrier path, loops are not fed around a corner, but in a plane parallel to the side face of the plate assembly 1. In use, the looper 100 is placed adjacent a clipper that moves in a plane perpendicular to the side face seen in FIG. 1, on the right hand side of the plate assembly 1. Most preferably, the clipper is in a retracted position when a loop window, to be described, is adjacent the lower right corner of the plate assembly 1. The clipper then advances in a direction toward the viewer of FIG. 1 toward its clipping position. The clipper moves the loop with it as it advances.

As an overview, loops are in series on the carrier, as in U.S. Pat. No. 5,755,022, with a difference being that for present purposes, the tie ends or knots are to the front of the loops as they advance. The loops travel the path of the arrow series 101 until they reach the lower right corner of the plate assembly 1. They are separated from the carrier and enter the clipper there. The carrier continues along the carrier path and exits the mechanism for disposal or recycling. All actions of the looper 100 are co-ordinated with those of the clipper.

Following the path of the loops and carrier, both start from a spool or reel 104. The reel 104 is mounted for rotation on a reel or spool shaft (not shown) held in place with a nut 106 (FIG. 2) and has a pneumatic brake 108 (FIG. 1). The shaft is on a loop spool mounting assembly 49 bolted at 110 to the plate assembly 1. Loosening the nut 106 and rotating the brake 108 increases and decreases tension on the reel 104. The brake 108 generally prevents the reel 104 from rotating when loops are not being fed.

The loops and carrier travel next to a roller 112 mounted on the loop spool mounting assembly 49. They wrap the roller 112 in part and go to large indexing rollers 47*a* and 47*b*.

The rollers 47*a*, 47*b* are fastened by fasteners 46 (FIG. 6) to shafts 114 (FIG. 6), one of which is on a loop idler arm assembly 51 (FIG. 6) and the other of which is on the plate assembly 1. An extension 116 (FIGS. 1, 2, 6) of the assembly 1 has a reduced thickness compared to the main portion of the assembly 1. The assembly 51 pivots around the right shaft 114. At the inner and right end of the assembly 51, an idler extension spring mounting block 52 (FIG. 6) and fastener 54 (FIG. 6) mount a spring 53 (FIG. 6) to the assembly 51. The other end of the spring 53 is fastened by a fastener 56 (FIG. 6) to an extension spring mounting block 55 (FIG. 6), which in turn is fastened by a fastener set 36, 57 (FIG. 6) to the assembly 1.

The rollers 47*a*, 47*b* and associated hardware constitute a loop idler arm and dancer. This device keeps essentially constant tension, via the spring 53, on the loop carrier tape from the beginning to the end of the spool, as the tape is unspooled and the distance of the tape from the spool center varies during the unwinding. Constant tape tension is important to precise loop placement. Tension on the loop idler arm is adjusted as needed through use of the slot in the block 55 to adjust the spring end location and spring tension.

The loops and carrier next circle partially around a next roller 47*c* (FIG. 1). Exiting the roller 47*c*, the loop and carrier move to and along the bottom side of a plate 96 (FIGS. 1 and 6).

The plate 96 is mounted by fasteners 81 (FIG. 7) to the assembly 1, proximate to its bottom edge. It is essentially horizontal. The plate 96 is elongated in the direction of tape or carrier travel, and has a width perpendicular to the plane of the face of the assembly 1 as wide as or wider than the tape or carrier. The plate 96 has a substantially uniform rectangular cross-section, cut down in size to the downstream and right end for a portion of its length. At its downstream and right end, the plate 96 also has an end-facing slope or ramp 118 (FIG. 7). The carrier travels around the end of the plate 96 and along the slope 118.

As the loops and carrier move along the bottom side of the plate 96, they are acted on by strip plates or bars 90, 94, a brake 97, and an air blast 87. These and their action will be described in detail after the explanation of the travel of the carrier is completed.

As implied, the loops leave the carrier at the bottom right corner of the plate 96, in a maimer to be described. The carrier continues up the slope 118, and extends to an adjustable roller 102 held by an adjustable roller shaft 103 to an adjustable roller nut plate 122 (FIG. 2) by a nut 124 (FIG. 2), in an adjustable roller slot 120 (FIG. 7) in the assembly 1.

The carrier next travels around a loop tape guide wheel 45 (FIG. 1) and to an index wheel 126 (FIG. 1). The wheel 126 is mounted to a loop wheel index assembly 4 (FIG. 2) that is mounted the plate assembly 1. The assembly 4 includes a loop wheel index sprocket 128 that includes or is mounted on a shaft (not shown) that passes through the plate 1 for mounting of the wheel 126. A loop drive cylinder assembly 10 (FIG. 2) includes a pneumatic cylinder that drives, i.e., reciprocates, a cog 130 (FIG. 2) and its associated mounting 134 (FIG. 2). The mounting 134 is guided in its movement along a slide 132, and also guides the cog 130. The sprocket 128 is engaged by the cog 130, and indexes itself and the index wheel 126 a set angular movement with each movement of the cylinder of the drive assembly 10.

As in the past, the carrier or tape is perforated, and the index wheel 126 has matching radially projecting sprocket teeth such as tooth 136 (FIG. 1). As most preferred, the wheel 126 has six teeth and indexes sixty degrees of rotation with each advancement of the drive assembly 10, moving the carrier and upstream loops a distance corresponding to the dimension between two adjacent teeth. A loop index wheel brake assembly 19 (FIG. 2) brakes the sprocket 128 for smooth, accurate indexing.

The carrier extends next to three successive loop tape guide wheels 45, on its way to a tape drive wheel 6 (FIGS. 1 and 6). A looper idler wheel assembly 37 (FIGS. 1 and 6) presses against the wheel 6 under action of a spring between an assembly arm and an abutment mounted on the assembly 1 (see FIG. 1). The wheel 6 is driven in common with the index wheel 126 under action of a belt 138 (FIG. 2) that engages a belt sprocket on the sprocket 128 (see FIG. 2) and a tape drive wheel sprocket 140 (FIG. 2). An idler shaft and roller 129 (FIG. 2) maintains belt tension, which may be adjusted (see FIG. 2).

The carrier then exits the assembly 1 through a final guide 142 (FIGS. 1 and 6).

Returning to the area of the strip plates 90, 94, each strip plate 90, 94, is generally a Z-shaped member (see FIG. 7). Strip plate 90 defines a central portion 141, end portion 143 and end portion 152. The two end portions 143 and 152 are at substantially right angles to the central portion 141. Similarly, strip plate 94 defines a central portion 145, end portion 147 and end portion 154. The two end portions 147 and 154 are at substantially right angles to the central portion 145. The end portions 143 and 147, closest to the assembly 1 (see FIG. 7), are shafts for pivotal mounting on the assembly 1, with the end portion 143 of the strip plate 90 receiving the end portion 147 of the strip plate 94 for concentric mounting. The other end portions 152, 154 and the central portions 141, 145 are together L-shaped. The central portions 141, 145 extend generally perpendicularly to the shaft-forming end portions 143, 147, to pivot around the axes defined by the shaft-forming end portions 143, 147 (see FIG. 7). The strip plates 90, 94 are mounted in a recess 149 of the assembly 1 face behind the plate 96 (see FIGS. 1, 3, 4, and 7).

The strip plates 90, 94 are respectively driven by an upper strip plate cylinder assembly 144 (FIG. 2) and a lower strip plate cylinder assembly 146 (FIG. 2). The assemblies 144, 146 include pneumatic cylinders, and linkages to the strip plates 90, 94 (see FIGS. 1 and 2). The assemblies also include adjustable clevis joints such as 148, 150 for adjustability.

The end portions 152, 154 (FIG. 7) of the plates 90, 94 extend generally parallel to the plate 96, to each other, and to the shafts at the other ends of the plates 90, 94. In some positions of operation, the end portion 152 of the upper plate 90 is in the plane of the plate 96 (as in FIGS. 1, 3 and 4) and just off the end of the plate 96 adjacent the slope 118. The end portion 154 of the plate 94 underlies the plate 96 and the end portion 152. Under action of their different cylinder assemblies 144, 146, the plates 90, 94 may be driven down in tandem or unison, apart, and the like (compare FIGS. 3 and 4). This will be explained.

The brake 97 includes a brake body mounted on a shaft 95 (FIG. 7). A fastener 63 places a brake block 82 (FIG. 7) on the left, upstream and upper surface of the brake body. To the near right of the pivot point of the body, fasteners 65, 66 place an air blast assembly 87 (FIG. 7) on the right, downstream and upper surface of the brake body. The assembly 87 includes two air blast tubes pointed to the right and downstream, i.e., toward an adjacent clipper, and the assembly 87 is fed pressurized air through an elbow 64 (FIG. 7) from a flow control 105 (FIG. 7). The air blast tubes overly a plate extension of the brake body (see FIGS. 3 and 4) that has a central, V-shaped recess (FIG. 7). A brake cylinder assembly 156 (FIG. 2) that includes another adjustable clevis 158 (FIG. 2) in a linkage 160 (FIG. 2) to the shaft 95 drives pivoting of the brake 97 (compare FIGS. 3 and 4).

When the assembly 1 is placed for operation, the space 162 (FIG. 3) adjacent the end portions 152, 154 of the strip plates 90, 94 is met by, i.e., is juxtaposed with, a loop window 164 (FIG. 5) of a clipper die support 166 (FIG. 5). The loop window is closer to the anvil or die 170 (FIG. 5) of the die support 166 than is the clip window 168 (FIG. 5). Thus, as a clip moves from the clip window down the clip channel 172 under action of a punch (not shown), the clip may capture a loop lying through or into the loop window 164. A captured loop will be fastened under the clip with any material in a chub or other product to be clipped.

Operation of the mechanisms of the looper 100 and the punch of the clipper are co-ordinated with each other, through automatic controls. With adjustments properly made, through the mechanisms of adjustment described above and such other adjustment mechanisms as are visible on the looper 100, when the clipper is retracted, the loop window meets the space adjacent the strip plates. Also at that time and place, a tie end of a loop is in and through the loop window. The loop end of the loop extends to the left (FIGS. 3 and 4) and upstream, and the loop end is adhered to the carrier above. The carrier is threaded as in arrow series 101. A next tie end of a next loop is to the left and upstream of the tie end in the loop window, as are all the further tie ends of the loops to be captured by the clipper. The next loop end of the next loop is upstream of that next loop's tie end, as are all the further loop ends. The conditions of FIG. 4 prevail.

With the tie end in the loop window 164, a clamp on the clipper (not shown) clamps the tie end to the clipper and strips the loop end of the loop from the carrier as the clipper moves to advanced position. There, and/or on the way there, the punch drives a clip to the die 170, capturing the subject loop.

While the clipper is functioning, the looper mechanisms become active. With proper adjustments, the indexing that delivered the captured loop to the loop window 164 has delivered the next loop into the area of the ends 152, 154 of the strip plates 90, 94. Each "next" loop in this position is called here the "loop adjacent the clip attachment apparatus," since with the captured loop gone, no other loop is closer to the clipper for present purposes The tie end of this loop adjacent the clip attachment apparatus is specifically delivered to the area of the ends 152, 154 for contact by the ends 152, 154. The underlying carrier crosses the downstream and right end of the plate 96 and is poised to move up and around to the index wheel 126.

The brake 97 is set, as it has been, to the position of FIG. 4. The drives 144, 146 move the plates 90, 94 downward in unison, capturing the tie end of the loop adjacent the clip attachment apparatus between their ends 152, 154. The downward action of the plates 90, 94 strips the tie end of the subject loop from the carrier. The set brake 97 resists movement of the carrier during action of the plates 90, 94, and resists stripping of any other upstream loops.

The drives 144, 146 again become active. The drive 144 moves the plate 90 up, to the positions of FIGS. 3 and 4. The drive 146 moves the lower plate 94 up, moving the tie end up with it, to put it in "insert" position. The brake 97 releases, to the position of FIG. 3. This release positions the air blast tubes toward the tie end of the subject loop. The wheel 126 indexes. The tie end of the loop adjacent the clip attachment apparatus rides between the plates 90, 94 and sometimes along the plate 94 and into the window 164. The air blast functions, to aid in assuring complete knot or tie end insertion into the window 164.

The brake 97 resets. The clipper clamps, moves, and sets its clip, taking the loop with it. The brake is reset to avoid dislodging of other loops.

The cycle repeats. As before, the indexing that delivered the captured loop to the loop window 164 has delivered the next loop into the area of the ends 152, 154 of the strip plates 90, 94. The drives 144, 146 move the plates 90, 94 downward in unison, capturing the tie end of the loop adjacent the clip attachment apparatus between the plate ends 152, 154. They strip the tie end of the subject loop from the carrier. The drive 144 moves the plate 90 up. The drive 146 moves the lower plate 94 up, moving the tie end up with it in "insert" position. The brake 97 releases. The wheel 126 indexes. The tie end of the loop adjacent the clip attachment apparatus rides along the plate 94 and into the window 164. The next loop is positioned. The air blast functions. The brake 97 resets. The clipper clamps, moves, and sets its clip, taking the loop with it.

The cycle repeats. The actions of the cycle may happen in the described sequence or in any desired order, as may other events of action of the looper's mechanisms, so long as loop delivery is adequately accomplished.

The looper 100 is thus a mechanism for feeding loops in series on a carrier to a clip attachment apparatus, where the loops having tie portions, the carrier is a tape, and the loops are in substantially equidistant series on the carrier. The looper 100 comprises the referenced rollers, with the carrier passing around the rollers, and includes a dancer. The plate 96 is a stationary plate, with the carrier passing along this stationary plate. The strip plates 90, 94 are pivotally mounted on the mechanism adjacent the stationary plate. A loop and carrier drive is on the mechanism for driving the loops on the carrier toward the clip attachment apparatus. A strip plate drive in the form of the plate cylinder assemblies 144, 146 is on the mechanism for driving the strip plates to and from a position in which the strip plates strip a loop adjacent the clip attachment apparatus at least partially from the carrier. The strip plate drive comprising assemblies 144, 146 pivots the strip plates to catch the loop adjacent the clip attachment apparatus between the strip plates and pull the loop at least partially from the carrier. The strip plates include an upper strip plate 90 and a lower strip plate 94. The strip plate drive pivots the upper strip plate 90 to catch the loop that is adjacent the clip attachment apparatus between the upper strip plate 90 and the lower strip plate 94, to pull the tie portion of the loop from the carrier. The loop and carrier drive indexes the carrier in the area of the strip plates a distance corresponding to one loop following each action of the strip plate drive to drive the strip plates to and from a position in which the strip plates strip a loop adjacent the clip attachment apparatus at least partially from the carrier. A loop brake is also on the mechanism, in the form of brake 97. The loop brake is for braking the carrier to allow the strip plates to better strip the loop at least partially from the carrier. The loop brake brakes the carrier while the strip plates strip the loop at least partially from the carrier. The mechanism 100 also comprises an air blast for assisting in loop feeding to the clip attachment apparatus.

A method of the functioning of the looper 100 is the feeding of loops in series on a carrier to a clip attachment apparatus, utilizing strip plates. The method comprises moving the loops on the carrier toward the clip attachment apparatus, and moving the strip plates to strip a loop adjacent the clip attachment apparatus at least partially from the carrier. The method also comprises intermittently braking the carrier.

The preferred embodiment of the invention and the invention in all its aspects are now described in such full, clear, concise and exact terms as to enable a person of skill in the art to make and use the same. To particularly point out and distinctly claim the subject matter regarded as invention, the following claims conclude this specification.

The invention claimed is:

1. A mechanism for feeding loops in series on a carrier to a clip attachment apparatus, comprising:

a loop and carrier drive on the mechanism for driving the loops on the carrier toward the clip attachment apparatus;

strip plates on the mechanism; and a strip plate drive on the mechanism for driving the strip plates to and from a position in which the strip plates strip a loop adjacent the clip attachment apparatus at least partially from the carrier, whereby the strip plates are pivotally mounted on the mechanism, the strip plate drive pivoting the strip plates to catch the loop adjacent the clip attachment apparatus between the strip plates and pull the loop at least partially from the carrier.

2. A mechanism as in claim 1, further comprising a loop brake on the mechanism, the loop brake for braking the carrier to allow the strip plates to better strip the loop at least partially from the carrier.

3. A mechanism as in claim 2, the loop brake braking the carrier while the strip plates strip the loop at least partially from the carrier.

4. A mechanism as in claim 1, further comprising rollers, the carrier passing around the rollers.

5. A mechanism as in claim 1, further comprising a stationary plate, the carrier passing along the stationary plate and the strip plates mounted adjacent the stationary plate.

6. A mechanism as in claim 1, the loops in substantially equidistant series on the carrier, the loop and carrier drive indexing the carrier a distance corresponding to one loop in association with each action of the strip plate drive to drive the strip plates to and from a position in which the strip plates strip a loop adjacent the clip attachment apparatus at least partially from the carrier.

7. A mechanism as in claim 1, further comprising a dancer on the mechanism, the carrier passing around the dancer.

8. A mechanism as in claim 1, the loop having a tie portion, the strip plates stripping the tie portion from the carrier.

9. A mechanism as in claim 1, the carrier being a tape.

10. A mechanism as in claim 1 further comprising, an air blast on the mechanism for assisting in loop feeding to the clip attachment apparatus.

11. A mechanism for feeding loops in series on a carrier to a clip attachment apparatus, comprising:

a loop and carrier drive on the mechanism for driving the loops on the carrier toward the clip attachment apparatus;

strip plates on the mechanism;

a strip plate drive on the mechanism for driving the strip plates to and from a position in which the strip plates strip a loop adjacent the clip attachment apparatus at least partially from the carrier; and a stationary plate, the carrier passing along the stationary plate and the strip plates mounted adjacent the stationary plate, the strip plates pivotally mounted on the mechanism, the strip plates including an upper strip plate and a lower strip plate, the strip plate drive pivoting the upper strip plate to catch the loop that is adjacent the clip attachment apparatus between the upper strip plate and the lower strip plate, to pull the loop at least partially from the carrier.

12. A mechanism for feeding loops in series on a carrier to a clip attachment apparatus, comprising:

a loop and carrier drive on the mechanism for driving the loops on the carrier toward the clip attachment apparatus;

strip plates on the mechanism;

a strip plate drive on the mechanism for driving the strip plates to and from a position in which the strip plates strip a loop adjacent the clip attachment apparatus at least partially from the carrier, whereby the loops are in substantially equidistant series on the carrier, the loop and carrier drive indexing the carrier a distance in the areas of the strip plates corresponding to one loop following each action of the strip plate drive to drive the strip plates so as to strip a loop at least partially from the carrier.

13. A mechanism for feeding loops in series on a carrier to a clip attachment apparatus, the loops having tie portions, the carrier being a tape, and the loops in substantially equidistant series on the carrier, the mechanism comprising:

rollers, the carrier passing around the rollers;

a dancer, the carrier passing around the dancer;

a stationary plate, the carrier passing along the stationary plate;

strip plates pivotally mounted on the mechanism adjacent the stationary plate;

a loop and carrier drive on the mechanism for driving the loops on the carrier toward the clip attachment apparatus;

a strip plate drive on the mechanism for driving the strip plates to and from a position in which the strip plates strip a loop adjacent the clip attachment apparatus at least partially from the carrier, the strip plate drive pivoting the strip plates to catch the loop adjacent the clip attachment apparatus between the strip plates and pull the loop at least partially from the carrier, the strip plates including an upper strip plate and a lower strip plate, the strip plate drive pivoting the upper strip plate to catch the loop that is adjacent the clip attachment apparatus between the upper strip plate and the lower strip plate, to pull the tie portion of the loop from the carrier; the loop and carrier drive indexing the carrier in the area of the strip plates a distance corresponding to one loop following each action of the strip plate drive to drive the strip plates to and from a position in which the strip plates strip a loop adjacent the clip attachment apparatus at least partially from the carrier; and a loop brake on the mechanism, the loop brake for braking the carrier to allow the strip plates to better strip the loop at least partially from the carrier, the loop brake braking the carrier while the strip plates strip the loop at least partially from the carrier.

* * * * *